May 27, 1969   TOZABURO KUHARA   3,446,118
VARIABLE TORQUE HYDRAULIC GEAR MOTOR
Filed Oct. 28, 1966

T max.  n min.

T min.  n max.

United States Patent Office 3,446,118
Patented May 27, 1969

3,446,118
VARIABLE TORQUE HYDRAULIC GEAR MOTOR
Tozaburo Kuhara, 1—53 Shiba-shiroganedai-machi, Minato-ku, Tokyo, Japan
Filed Oct. 28, 1966, Ser. No. 590,358
Int. Cl. F01c *31/12, 21/16, 1/12*
U.S. Cl. 91—59                                    5 Claims

ABSTRACT OF THE DISCLOSURE

A variable torque hydraulic gear motor in which a pair of gears are in engagement in adjustable fashion are rotatably mounted in a casing, one gear being rigidly mounted on an output shaft, the other gear being mounted as a part of a piston assembly on a second shaft between a shaped piston and a hydraulic piston. The piston assembly is retained in a regulating cylinder for axial movement, said casing having an inlet and an outlet respectively for introducing an exhausting fluid under pressure to and from the engaging portions of said gears, and a second inlet for introducing fluid under pressure from the same source in one end of the regulating cylinder to urge the hydraulic piston and consequently the piston assembly against the action of spring means acting thereon.

---

This invention relates to a prime mover capable of converting energy of a liquid under pressure flowing between meshing gears to rotational power of said gears, which shall hereafter be called a hydraulic gear motor. More particularly, the invention relates to a novel variable torque hydraulic gear motor capable of carrying out output control, such as speed control and torque control, continuously and in a simple manner, and thus is suitable for applications in various industrial fields.

In most conventional motors of the type referred to above, when oil is fed at a certain pressure and at a certain flow rate, the output torque is kept constant. In some cases, the output torque can be obtained in two or three different steps. In any case, conventional hydraulic gear motors have proved unsatisfactory in that the rotational speed can be changed only in steps.

Therefore, the principal object of the invention is to obviate the aforementioned disadvantage by providing a variable torque hydraulic gear motor, comprising a casing, a pair of gears meshing with each other and rotatably retained in said casing, an out-put shaft on which one of said gears is rigidly mounted, a piston assembly consisting of a specially shaped piston loaded with spring means and a second shaft mounted with the other of said gears freely rotatable thereon and a hydraulic piston, a regulating cylinder retaining said piston assembly so as to move said assembly axially therein, an inlet and outlet groove being formed in said casing respectively for introducing and exhausting fluid under pressure to and from the engaging portion of said gears, and a second inlet groove for introducing fluid under pressure from the same source in one end of said cylinder so as to urge said hydraulic piston and consequently said piston assembly against the action of said spring means, whereby when said output shaft is stationary or rotates relatively at lower speed or the load on said output shaft is too great the increased pressure of the fluid acting on the hydraulic piston moves the freely rotatable gear so as to increase the engaging width thereof with said one gear while said engaging width is decreased when said load is lowered and consequently said output shaft rotates at higher speed, so as to automatically vary the output torque and rotational speed of said hydraulic gear motor responsive to the load irrespective of the variation of the input.

Thus, with the hydraulic gear motor according to the invention, the operation of various kinds of automatic control systems, such as a feedback control system, remote control system, a constant speed control system, etc., can be improved greatly. Accordingly, the gear motor of the invention can be used in various industries, and moreover, new fields of applications of the gear motor may be developed in the future.

In other words, the hydraulic gear motor of the invention is characterized by having a novel mechanism for varying the face width of that portion of the gears (to be referred to as "the engaged face width" hereinafter for brevity), When the load of the gear motor is large, the engaged face width is increased to ensure a stable engagement between the gears by applying the oil pressure to the entire face width of the gears, while when said load is small, the engaged face width may be reduced. Accordingly, the gear motor of the invention is advantageous from the standpoint of structural strength too. Besides, with the gear motor of the invention, the variation of oil pressure is small for a given variation of the load on the gear motor, which is favorable for the design of the structure thereof, because it is unnecessary to provide large margins or safety in the mechanical strength of the body, valves, pipes, coolers, filters, and other components of the torque gear motor. Thus, the gear motor of the invention can be made compact in size, light in weight, simple and strong in construction.

Other salient features of the hydraulic gear motor of the invention are as follows. If the gear motor of the invention is used in a machine tool, a quick return mechanism thereof can be simplified, and it will be possible to vary the cutting speed automatically responsive to such factors as the size of the work to be cut, the material thereof, the number of cutting tools, the depth to be cut, etc. In other words, in a machine tool equipped with such gear motor, the rotation of the machine tool can be controlled manually prior to the beginning of the cutting operation, but said rotation can be automatically controlled as soon as the cutting operation is started, and by addition of another simple control means, such as a lever, said rotation can be manually selected at will at any desired value. Accordingly, the gear motor of the invention is suitable for digital control of machine tools. If such gear motor is mounted on a machine tool, the operative efficiency of the machine tool can be improved regardless of the kind of the work to be cut thereby.

The operative characteristics of the gear motor of the invention is not affected at all by the direction of rotation of the gears thereof, and hence, it is particularly suitable for a speed change gear of a machine whose orientation cannot be changed easily, such as railroad vehicles. With such a gear motor, the production of a multi-truck trailer may become possible in the future.

The gear motor of the invention can be also used for fine control of a relief valve on an automobile for selecting the best combination of the running characteristics and the fuel consumption rate of the automobile. For instance, a low rate of fuel consumption is very important for commercial automobiles such as taxicabs, while in the case of a sports car, the running characteristics are more important than the fuel consumption. The hydraulic gear motor of the invention can provide the best combination of such incompatible requirements. With such gear motor, an automobile may be used in two ways, i.e. as a commercial car and a sports car. With a conventional torque convertor, it has not been possible to use enginebraking at a desired moment in a preferred manner. However, with the gear motor of the invention, enginebraking can be applied at will, and an automobile having the gear motor of the invention can be operated effectively for running in mountainous areas.

In older automobiles, the use of a conventional torque convertor can cause frequent stalling of the engine thereof. The gear motor of the invention is effective in eliminating such engine stalling by simple adjustment of a relief valve without increasing the speed of the idling of the engine.

The hydraulic gear motor of the invention can be also used in construction machinery, such as a bulldozer to improve the efficiency of such machinery. For instance, with the gear motor of the invention, a bulldozer can be operated at a slow speed when the load is heavy, but it can be moved quickly when the load is light to handle the earth more quickly or to approach the location of earth handling at a higher speed. If two hydraulic gear motors of the invention are mounted on a bulldozer, i.e. one each side thereof, then a conventional differential mechanism of the bulldozer can be dispensed with, and in addition, the wheels on both sides can be rotated in opposite directions at the same time. Thus, driving and steering of the bulldozer can be carried out at the same time, and idling of the wheels on one side thereof caused by the use of differential means can be eliminated.

In a conventional automobile, a driving shaft and differential means have been placed underneath the floor to raise the position of the center of gravity of the automobile, thus the stability has been poor and the space underneath the floor has not been utilized effectively. However, if the hydraulic torque gear of the invention is mounted on such automobile, there will be only pipings underneath the floor to allow non-constructional utility of the space above the minimum ground clearance. For instance, one may place his personal luggage under the floor, provided that such luggage be kept above said minimum ground clearance. Thus, the overall loading conditions of the automobile can be so improved that the need of a balancing weight may be eliminated to save wasteful space and energy. The gear motor of the invention is thus particularly suitable for such automobiles as for boring, pile driving, material handling into and out of manhole, etc. The hydraulic gear motor of the invention may be also used in a winch for handling fishing nets, agricultural machines, shipping and marine equipment, airplanes, etc.

For a better understanding of the invention, reference is made to the accompanying drawings illustrating an embodiment of the invention, in which.

Figure 1:
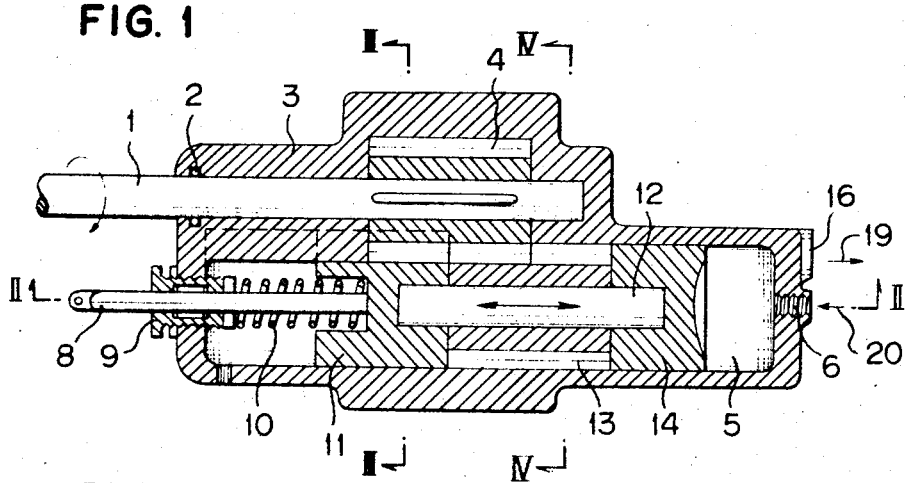
FIG. 1 is a longitudinal vertical sectional view of a variable torque gear motor embodying the invention.
Figure 2:
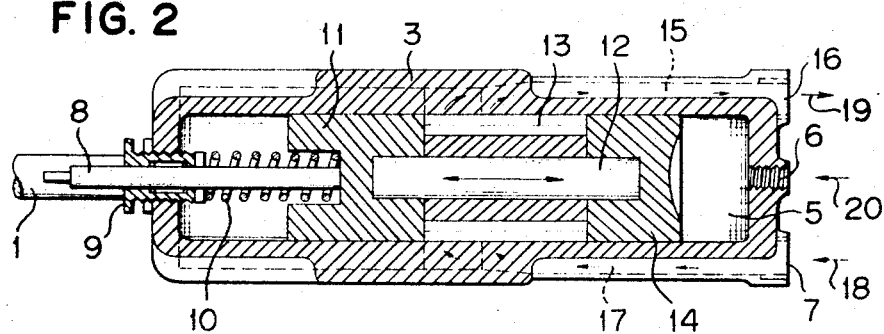
FIG. 2 is a plan view partly in section, taken on line II—II of FIG. 1.
Figure 3:
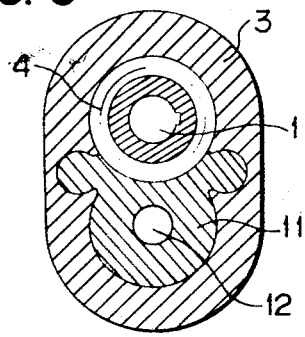
FIG. 3 is a sectional side view, taken on line III—III of FIG. 1.
Figure 4:
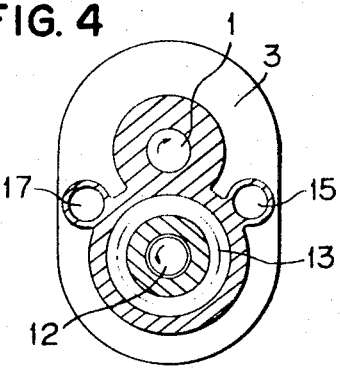
FIG. 4 is a similar view to FIG. 3, taken on line IV—IV of FIG. 1.
Figure 6A:
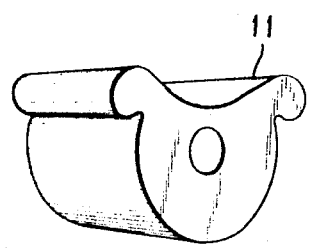
Figure 7:
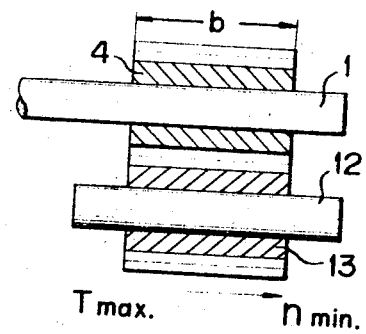
Figure 6B:
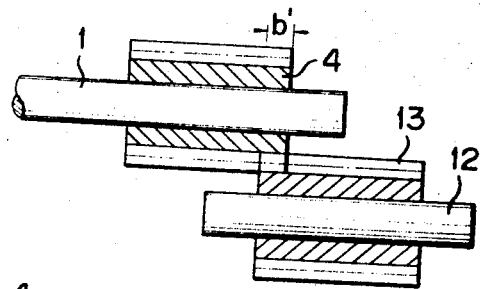
Figure 9:
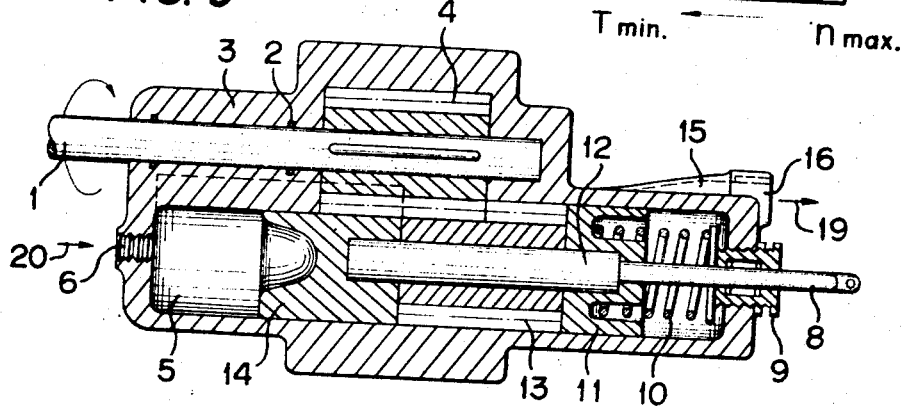
Figure 8A:
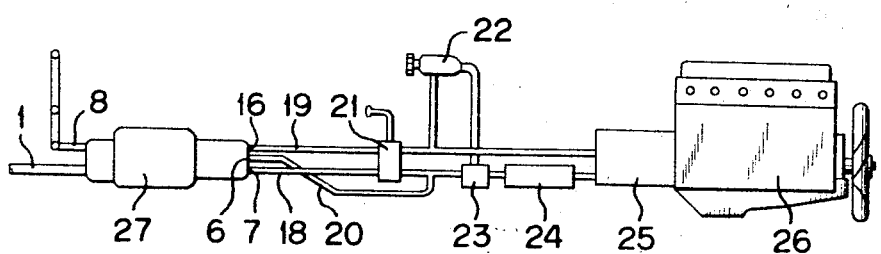
Figure 8B:
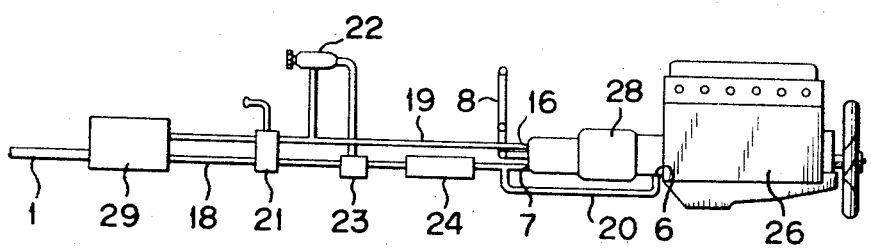
Figure 8C:
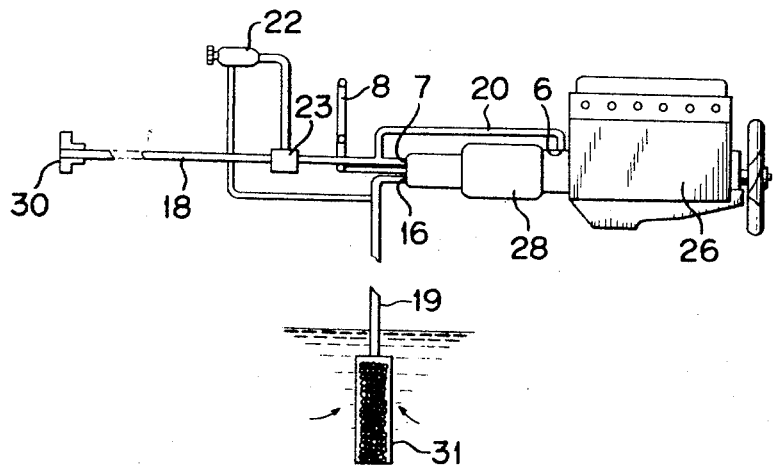
Figure 10:
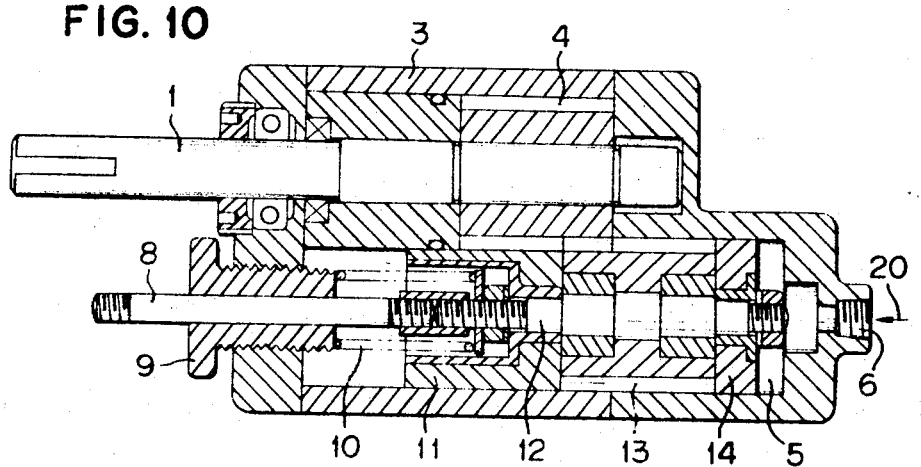
Figure 11:
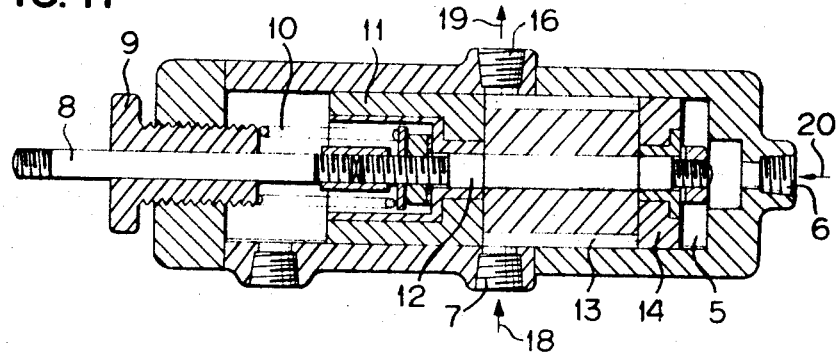
Figure 12:
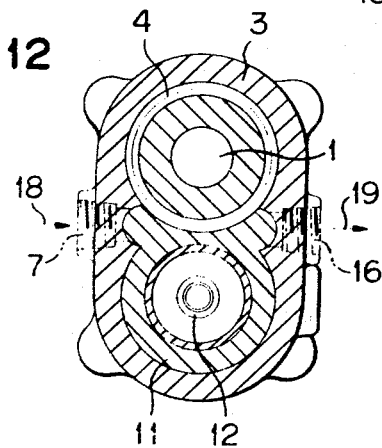

FIG. 6-A and 6-B are sectional views of a gear assembly consisting of a driving gear and a driven gear, showing different engaging conditions respectively;

FIG. 7 is a diagram illustrating the operative characteristics of the torque gear motor;

FIGS. 8-A to 8-C are diagrammatic illustrations of different piping systems for actuating the torque gear motor;

FIG. 9 is a longitudinal vertical sectional view of a different form of the torque gear motor of the invention; and FIGS. 10 to 12 are views similar to FIGS. 1 to 3 respectively, showing an actual torque gear motor according to the invention.

As described in the foregoing, the torque gear motor of the invention is characterized in obtaining any desired torque and rotating speed by varying continuously the aforementioned engaged face width of the gears.

There is the following relation between the torque T, the oil pressure P, and the theoretical oil discharge $V_{th}$ per revolution of the gear motor.

$$T = P \cdot V_{th}/2\pi \quad (1)$$

There is also a relation defined by the following Formula 2 between the aforementioned engaged face width $b$ of the driven gear, the radius $R_p$ of a pitch circle, the radius $R_c$ of a tip cylinder, the radius $R_g$ of a base circle, the number $Z$ of teeth of the gear, and the theoretical discharge $V_{th}$ per one revolution of the gear.

$$V_{th} = 2\pi b (R_c^2 - R_p^2 - \tfrac{1}{12}(2\pi R_g/Z)^2) \quad (2)$$

By substituting the Formula 2 in the Formula 1, one obtains $$T = P \cdot b (R_c^2 - R_p^2 - \tfrac{1}{12}(2\pi R_g/Z)^2) \quad (3)$$

In the Formula 3, the value of the term $$(R_c^2 - R_p^2 - \tfrac{1}{12}(2\pi R_g/Z)^2)$$

is determined definitely in the process of designing the torque gear motor and cannot be changed continuously during its operation, but the oil pressure P can be changed comparatively easily. However, if the gear motor is designed for variable oil pressure, then the entire gear motor should withstand the maximum oil pressure to be used, which leads to a bulky machine not suitable for moving purposes, and in addition, such design is not favorable from an economical standpoint.

Thus, according to the present invention, the aforementioned engaged face width $b$ of the driven gear is varied to change the area in which the oil acts on the tooth surfaces. Accordingly, the torque is varied while maintaining the oil discharge rate substantially constant, and the rotational speed of the torque gear motor can be varied over a considerably wide range. Such variation of the rotational speed of the gear motor can be carried out automatically by an oil pressure representing a feedback quantity responsive to the variation of the speed of the gear motor caused by a change in the loading thereof. If the feedback quantity is set manually, then the speed of the gear motor can be selected at will, and furthermore, by turning over a separately provided switching means, such as a spool valve means, the direction of rotation of the gear motor can be also reversed.

Referring to FIG. 1, the reference numeral 1 designates an output shaft, 2 a packing, 3 a casing for the body of a hydraulic gear motor, and 4 a driving gear. The driving gear 4 is secured to the output shaft 1 shielded by the packing 2 and enclosed in the upper portion of the casing 3 in a rotatable manner. A gear 13 to be engaged with the gear 4 is loosely mounted on a gear shaft 12 having a special shape piston 11 secured to one end thereof and a hydraulic piston 14 secured to the opposite end thereof. The gear 13 having pistons 1 and 14 is enclosed in a regulating cylinder 5 formed parallel with said output shaft 1.

Figure 5:
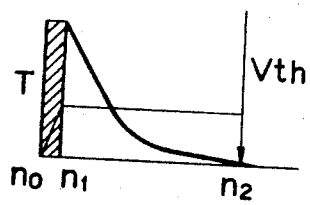
FIG. 5 is a perspective view of a special shape piston to be used in the gear motor of FIG. 1.

A regulating rod 8 penetrates through a regulating screw sleeve 9 screwed in the casing 3 and extends to the outer side or left side surface of the special shape piston 11, and a coiled spring 10 is inserted between the sleeve 9 and the special shape piston 11, as shown in FIG. 1. FIG. 5 shows a perspective view of the special shape piston 11. The special shape piston 11 and the hydraulic piston 14 are secured to the gear shaft 12 in a concentric manner. The gear 13 rotates with respect to the gear shaft 12, the special shape piston 11, and the hydraulic piston 14, while said gear 13 moves together with said gear shaft and piston in the direction as shown by arrows M–N of FIGS. 1 and 2. Thereby, the engaged face width $b$ of the gear 13 can be easily varied.

High pressure regulating oil is delivered to the regulating cylinder 5 through a regulating oil entrance 6 from a feedback circuit 20 responsive to variation in the loading conditions, as shown in FIG. 8-A. Upon increase of the oil pressure in the high pressure regulating oil, the hydraulic piston 14 is urged leftwards, while the special shape piston 11 is urged rightwards by the elastic force of the coiled spring 10 to balance with said oil pressure and hold the gear 13 at a certain position. Thus the position of the gear 13 is shifted responsive to the variation of the oil pressure of the high pressure control oil. The regulating screw sleeve 9 is provided to regulate the elastic force of the coiled spring 10.

A high pressure pipe 18 and a low pressure pipe 19 shown in FIG. 8–A are connected to an inlet opening 7 and an outlet opening 16 of the casing 3 respectively. By the operation of a spool valve means 21 for start-stop and direction-selection, the direction of rotation of the output shaft 1 can be changed from clockwise to counterclockwise and vice versa by switching over the circuitry of the pressure oil. The pressure oil flows into and out of the engaging portion of the gears 4 and 13 through the pressure oil passageways 15 and 17.

The operation of the hydraulic torque gear motor of the invention thus constructed will now be described. Referring to FIGS. 1 to 4 and FIGS. 8–A to 8–C, the pressure oil is delivered from the high pressure pipe 18 to the engaging portion of the gears 4 and 13 through the inlet opening 7 and the pressure oil passageway 17, and said pressure oil in said engaging portion acts to rotate said gears and accordingly the output shaft 1 and the gear shaft 12 in directions shown by arrows $S_1$ and $S_2$ of FIG. 4. On the other hand, a part of the pressure oil is branched off from the high pressure pipe 18 to the feedback circuit 20 and then delivered to the regulating cylinder 5 through the regulating oil entrance 6 to act on the hydraulic piston 14 to urge said piston 14 toward the left as viewed in FIGS. 1 and 2.

If the output shaft 1 is overloaded and the driving shaft 4 is rotated at the lowest possible speed or stopped, then the flow rate of the pressure oil to the gears 4 and 13 is reduced to the minimum or to zero, because the theoretical oil discharge rate per rotation of the gear motor is proportional to the rotational speed thereof. Thus, flow of the pressure oil through the inlet opening 7 is substantially interrupted, while flow of the pressure oil through the regulating oil entrance 6 to the regulating cylinder 5 is apt to be maintained at a constant pressure and at a constant rate. Thereby, the hydraulic piston 14 is urged leftwards together with the gear shaft 12, special shape piston 11, and the gear 13 against the elastic force of the coiled spring 10 until the full length of the gear 13 is brought into engagement with the gear 4, as shown in FIG. 6–A. Consequently, the total area on which the pressure oil acts on the tooth surfaces is increased to the maximum to raise the force to rotate the gear 4 i.e. the output torque, and the output shaft 1 is rotated. In the case of such zero-rotation or extremely slow rotation, in order to prevent a prime mover 26 of FIG. 8–A from stalling, the pressure oil is returned to the main pressure oil pump 25 through a relief valve 23.

Then, after the rotational speed of the output shaft 1 and accordingly that of the gear 4 reaches a certain constant value, the discharge rate of the pressure oil through the outlet opening 16 is increased excessively to break the balance between the feeding and discharging of the pressure oil, and the oil pressure at the inlet opening 7 is reduced. Thus, the oil pressure in the regulating cylinder 5 tends to be lowered, and the elastic force of the coiled spring 10 acts to shift the assembly consisting of the special shape piston 11, the gear shaft 12, the hydraulic piston 14, and the gear 13 towards the right, and accordingly the engaged face width $b$ of the gear 13 is reduced, as shown in FIG. 6–B.

It is now apparent that when substantially the entire face width of the gear 13 is in engagement with the gear 4, as shown in FIG. 6–A, the rotational speed of the gear motor is low with a large torque, and on the other hand, when the face width of that portion of the gear 13 which is in engagement with the gear 4 is small, as shown in FIG. 6–B, the rotational speed of the gear motor is high with a small torque.

Referring to FIG. 7 illustrating the performance characteristics of the hydraulic torque gear motor of the invention, if the rotational speed of the gear motor is zero i.e. No in FIG. 7, the pressure oil only exerts its full pressure on the gear motor and the entire pressure oil delivered to the high pressure pipe 18 is returned to the main pressure oil pump 25 through the relief valve 23.

As the speed of the gear motor is increased gradually, the pressure oil is delivered to the gears 4 and 13 at an increasing flow rate. For very small speeds less than $n_1$, or for the hatched area in FIG. 7, the engaged face width $b$ of the gear 13 is kept at the maximum value to produce the maximum torque. As the speed of the gear motor is increased in excess of $n_1$, the engaged face width $b$ of the gear 13 is reduced to lower the torque, and the discharge rate of the pressure oil through the outlet opening is controlled accordingly to maintain the oil pressure substantially at a constant level.

In the process of shifting the gear 13, the pressure oil in the tooth spaces of the gear 13 and the pressure oil passageway 17 should not be released wastefully to the passageway 15 without doing any work. In order to prevent such wasteful leakage of the pressure oil, the leakage of the oil at either end of the gear 13 by the hydraulic piston 14 positioned adjacent to one end surface of the gear 13 so as to travel as a unit therewith and the special shape piston 11 positioned adjacent to the opposite end surface of the gear 13 so as to travel in conjunction with said gear 13 and said piston 14. The pistons 11 and 14 are secured to the gear shaft 12, on which the gear 13 is loosely mounted. As the aforementioned engaged face width $b$ of the gear 13 is reduced, the harmful and useless portions of the pressure passageways 15 and 17 are blocked out by said special shape piston 11. The elastic force of the coiled spring 10 acts to move the special shape piston 11 and the gear 13 as an integral body, so that there will be no oil leakage from the gap between the piston 11 and the gear 13 even when the gear 13 is shifted to modify the aforementioned engaged face width $b$.

In a particular combination of the variable torque gear motor 27 according to the invention and a main oil pressure pump 25 driven by a prime mover 26, as shown in FIG. 8–A, the pipes 18, 19, and 20 are connected as described hereinbefore. In addition to the aforementioned spool valve 21, there are provided a remote control valve 22, and a cooler 24 having a feed oil filter. The relief valve 23 is actuated both when the oil pressure of the pipe 18 is increased in excess of the maximum permissible level and when said oil pressure is lowered below a certain level responsive to the idling of the prime mover 26, and to ensure such actuation, of the relief valve 23, a fine regulation means is provided on the relief valve 23. The axial power $L_s$ of the prime mover 26 is given by the following formula.

$$L_s = P.Q = P.V_{th}.n$$

Here, $n$ is the revolving speed of the prime mover.

If the output power $L_s$ and the rotational speed $n$ of the prime mover are kept constant, then the oil pressure P is inversely proportional to the theoretical discharge $V_{th}$ per revolution of the gear motor.

FIG. 8–B shows a different way of utilizing the torque gear motor of the invention, in which the gear motor of the invention is used a variable face width type oil pump 28 in conjunction with an ordinary oil pressure motor 29 connected to said oil pump 28 through a high pressure pipe 18 extending from the inlet opening 7 of the oil pump 28 and a low pressure pipe 19 extending from the outlet opening 16 of the oil pump 28. In this particular embodiment, the variable face width type gear pump 28 is directly connected to the prime mover 26. The ordinary oil pressure motor 29 requires high pressure oil at a low flow rate when operated at a low speed, while requiring low pressure oil at a high flow rate when operated at a high speed.

On the other hand, if the axial power of the prime mover 26 is kept constant, there is the aforementioned relation, i.e. $L_s = P.Q = P.V_{th}.n =$ constant, and if the speed $n$ of the prime mover 26 is further assumed to be kept constant, then the speed of the oil pump 28 directly connected to the prime mover is also kept constant. Therefore, in order to meet the operative needs of the ordinary oil pressure motor 29 by changing P and Q, it is necessary to change the aforementioned engaged face width $b$ of the driven gear of the oil pump 28, as shown in the Formula 2 described hereinbefore.

FIG. 9 shows the construction of a variable face width type oil pump according to the invention, which is suitable for such applications. In the system shown in FIG. 8-B, if the ordinary oil pressure motor 29 is overloaded, the pressure oil from the variable face width type oil pump 28 is once delivered to the oil pressure motor 29 through the high pressure pipe 18, but due to the above overload conditions, the pressure oil is then fed back to the regulating oil entrance 6 through the feedback circuit 20. Referring to FIG. 9, the pressure oil thus fed back to the entrance 6 of the oil pump 28 is then fed into the regulating cylinder 5 to move the hydraulic piston 14 towards the right, and the engaged face width $b$ of the driven gear 13 is reduced in the same manner as described hereinbefore referring to FIGS. 1 to 4. When the hydraulic piston 14 is moved to the extreme right, then the aforementioned engaged face width $b$ is a minimum to reduce the discharge rate Q to the minimum while increasing the oil pressure P to the maximum, and thus, the oil pressure motor 29 is started.

As the speed of the pressure oil motor 29 is increased, the rate of oil discharge therefrom is increased, and at the same time, the oil pressure in the regulating cylinder 5 tends to be reduced as described hereinbefore referring to FIGS. 1 to 4. Thus, the special shape piston 11 and the hydraulic piston 14 are moved leftwards by the elastic force of the coiled spring 10 to increase the aforementioned engaged face width $b$ of the driven gear. Thereby, the rate of discharge Q is increased while reducing the oil pressure P, and accordingly the oil pump 28 is so operated as to satisfy the conditions of $L_s = P.Q =$ constant.

FIG. 8-C shows another way of utilizing the torque gear motor of the invention, in which the gear motor of the invention is used as a variable face width type water pump 28, and the high pressure pipe 18 extending from the water pump 28 is connected to a hose 30 having a controllable nozzle, while connecting the low pressure pipe 19 to a strainer 31. Since the operation of such water pump 28 is apparent to those skilled in the art from the foregoing descriptions, no detailed explanation of the water pump will be made here.

FIGS. 10 to 12 are sectional views similar to FIG. 1 to 3 respectively, showing construction of an actual variable torque gear motor according to the invention, in which the same reference numerals designate the same parts as FIG. 1 to 3. The operation of the variable torque gear motor shown in FIGS. 10 to 12 will be apparent to those skilled in the art.

What I claim is:

1. A variable torque hydraulic gear motor, comprising a casing, a pair of gears having engaging portions in mesh with each other and rotatably retained in said casing, an output shaft on which one of said gears is rigidly mounted, a piston assembly consisting of a shaped piston loaded with spring means, a second shaft mounted with the other of said gears freely rotatable thereon and a hydraulic piston, said shaped piston and hydraulic piston being mounted on said second shaft on opposite sides of said other gear, a regulating cylinder retaining said piston assembly for axial movement therein, said casing having an inlet and an outlet respectively for introducing and exhausting fluid under pressure to and from the engaging portions of said gears, and a second inlet for introducing fluid under pressure from the same source in one end of said cylinder to urge said hydraulic piston and consequently said piston assembly against the action of said spring means, whereby when said output shaft is stationary or rotates at low speed or the load on said output shaft is too great, the increased pressure of the fluid acting on the hydraulic piston moves the freely rotatable gear so as to increase the area of the engaging portion with said one gear while said area of the engaging portion is decreased when said load is lowered and consequently said output shaft rotates at higher speed, so as to automatically vary the output torque and speed of said hydraulic gear motor responsive to the load irrespective of the variation of the load, said casing having passageways leading from said inlets and outlets to said engaging portions of the gears, said passageways being laterally offset relative to said cylinder and isolated therefrom except in the region of said meshing gears, said shaped piston including a main portion conforming in shape to that of said regulating cylinder and tightly fitted therein and lateral projections tightly fitting in said passageways to prevent fluid from leaking past the adjacent end of said other gear.

2. A variable hydraulic gear motor as set forth in claim 1, which comprises further means for controlling the spring force acting on the shaped piston.

3. A variable torque hydraulic gear motor as set forth in claim 1, in which said hydraulic piston has a cross-section corresponding to that of said regulating cylinder in the region of the adjacent end of said other gear to prevent fluid under pressure from leaking at the adjacent end of said other gear.

4. A variable torque hydraulic gear motor as set forth in claim 1, in which said hydraulic piston, said shaped piston and said other gear are in abutment and are urged by means of the fluid under pressure and said spring means as a unitary assembly, whereby fluid leakage can be prevented even upon variation of the degree of engagement by said gears.

5. A variable torque hydraulic gear motor as set forth in claim 1, wherein said main portion of the shaped piston has an upper concave recess for receiving the said one gear as said shaped piston is displaced in the regulating cylinder.

References Cited

UNITED STATES PATENTS

| 2,223,838 | 12/1940 | Tweedale | 91—59 |
| 2,871,831 | 2/1959 | Patin | 91—56 |
| 2,293,126 | 8/1942 | Fersing | 103—126 |
| 3,213,763 | 10/1965 | Pearson | 91—75 |
| 3,319,494 | 5/1967 | Ulbing | 173—12 |
| 2,863,422 | 12/1958 | Mercier | 91—59 |
| 1,742,215 | 1/1930 | Pigott. | |
| 2,079,375 | 5/1937 | McCollum. | |
| 2,463,950 | 3/1949 | Carroll. | |
| 3,110,265 | 11/1963 | Miller. | |

FOREIGN PATENTS

| 551,114 | 2/1943 | Great Britain. |
| 858,777 | 1/1961 | Great Britain. |

EVERETTE A. POWELL, JR., *Primary Examiner.*

U.S. Cl. X.R.

91—75, 81, 87; 103—120